US011382332B2

(12) United States Patent
Morgan

(10) Patent No.: US 11,382,332 B2
(45) Date of Patent: *Jul. 12, 2022

(54) METHODS AND SYSTEMS FOR CONTROLLING INVASIVE MUSSEL SPECIES

(71) Applicant: Clyde Morgan, Gardner, KS (US)

(72) Inventor: Clyde Morgan, Gardner, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/951,323

(22) Filed: Nov. 18, 2020

(65) Prior Publication Data
US 2021/0068403 A1 Mar. 11, 2021

Related U.S. Application Data

(63) Continuation-in-part of application No. 16/271,523, filed on Feb. 8, 2019, now Pat. No. 10,863,747, which is a continuation-in-part of application No. 16/117,819, filed on Aug. 30, 2018, now abandoned.

(51) Int. Cl.
*A01N 63/10* (2020.01)
*A01N 63/20* (2020.01)
*A01N 65/00* (2009.01)
*A01N 65/03* (2009.01)
*A01N 65/08* (2009.01)
*A01N 65/20* (2009.01)
*A01N 65/44* (2009.01)

(52) U.S. Cl.
CPC ............ *A01N 65/44* (2013.01); *A01N 63/10* (2020.01); *A01N 63/20* (2020.01); *A01N 65/00* (2013.01); *A01N 65/03* (2013.01); *A01N 65/08* (2013.01); *A01N 65/20* (2013.01)

(58) Field of Classification Search
None
See application file for complete search history.

(56) References Cited

U.S. PATENT DOCUMENTS 10,863,747 B2 * 12/2020 Morgan ................ A01N 65/00

OTHER PUBLICATIONS

Andersen et al.( Predicted impact of zebra mussel (*Dreissena polymorpha*) invasion on water clarity in Lake Mendota, Canadian Journal of Fisheries and Aquatic Sciences 2000), 57(8), 1617-1626) (Year: 2000).*
Bayne et al., "Feeding and digestion by the mussel *Mytilus edulis* L. (Bivalvia : Mollusca) in mixtures of silt and algal cells at low concentrations," J. Exp. Mar. Biol. Ecol., 1987, vol. 111, pp. 1-22.
"The Cost of Invasion," Colorado Parks & Wildlife, Nov. 2016, 2 pages, retrieved from: < URL: https://cpw.state.co.us/Documents/ANS/2016%20ZQM%20Economic%20Impact%20Fact%20Sheet%20Finalpdf >.
Mussels of Illinois in the Collection of the Illinois State Museum, 6 pages, retrieved from: < http://www.museum.state.il.us/ismdepts/zoology/mussels/intro_anatomy.html >, accessed Jul. 31, 2018.
"Economic Impact of Invasive Species: Direct Costs Estimates and Economic Impacts for Washington State," Community Attributes Inc., Jan. 2017, 49 pages, retrieved from: <URL: https://invasivespecies.wa.gov/wp-content/uploads/2019/07/EconomicImptsRpt.pdf >.
"Estimated Potential Economic Impact of Zebra and Quagga Mussel Introduction into Idaho, Idaho Aquatic Nuisance Species Taskforce 2009, Prepared for the Idaho Invasive Species Council," 2009, 2 pages.
Vanderploeg et al., "Feedback between zebra mussel selective feeding and algal composition affects mussel condition: did the regime changer pay a price for its success?" Freshwater Biology (2009) 54, 47-63, < DOI: 10.1111/i.1365-2427.2008.02091.x >.
Bayne et al., "Feeding and Digestion in Suspension-Feeding Bivalve Molluscs: The Relevance of Physiological Compensations," Amer. Zool., 28:147-159 (1988).
"Invasive Species Impacts on Infrastructure," Invasive Species Advisory Committee, U.S. Department of the Interior, Dec. 6, 2016, 12 pages.
Miller et al., "Metabolic Physiology of the Invasive Clam, *Potamocorbula amurensis*: The Interactive Role of Temperature, Salinity, and Food Availability," PLOS ONE, Mar. 2014, vol. 9, Issue 3, e91064, 7 pages < DOI: 10.1371/journal.pone.0091064 >.
Connelly et al., "Economic Impacts of Zebra Mussels on Drinking Water Treatment and Electric Power Generation Facilities," Environmental Management, Aug. 2007, 40:105-112 < DOI: 10.1007/s00267-006-0296-5 >.
"Zebra and Quagga Mussels," Aquatic Invasions! A Menace to the West: Species Guide, Oregon Sea Grant (2017), 11 pages, retrieved from: < URL: https://ir.library.oregonstate.edu/concern/defaults/ks65hj966 >.
Rosaen et al., "The Costs of Aquatic Invasive Species to Great Lake States," Anderson Economic Group, LLC, Sep. 20, 2016, 51 pages.
Kennedy, Tony, "Infested Waters: Unleashing a Blitz on Zebra Mussels," Minneapolis Star Tribune, Jul. 31, 2017, 5 pages, retrieved from: < URL: http://e.startribune.com/Olive/ODN/StarTribune/shared/ShowArticle.aspx?doc=MST%2F2017%2F07%2F31&entity=Ar00107&sk=97AE2126&mode=text >.
Smith, J.B., "Waco officials will try to smother invasive zebra mussels," Waco Tribune, Oct. 6, 2014, 5 pages, retrieved from: < URL: https://www.wacotrib.com/news/local/waco-officials-will-try-to-smother-invasive-zebra-mussels/article_e12ef9ec-b146-5e97-8807-b9a2ccc2d888.html >.

(Continued)

Primary Examiner — Alton N Pryor
(74) Attorney, Agent, or Firm — Hovey Williams LLP

(57) ABSTRACT

Methods and systems for killing, preventing, or inhibiting the growth and spread of invasive *Dreissenid* mussel species, such as Zebra mussels (*Dreissena polymorpha*) and Quagga mussels (*Dreissena rostriformis bugensis*) are provided herein. The treatment methods and systems utilize a nonnative source of chlorophyll introduced to a body of water to increase the chlorophyll concentrations in bodies of water. The increased chlorophyll concentration effectively kills or prevents the spreading of the invasive mussel species in the bodies of water. The methods and systems of the present invention advantageously avoid the use of heavy metals or pesticides that may pose health risks to humans. Additionally, embodiments of the present invention can use treatment doses that are nonharmful to other aquatic life.

40 Claims, 4 Drawing Sheets

(56) References Cited

OTHER PUBLICATIONS

"Zebra Mussel Fact Sheet," Cary Institute of Ecosystem Studies, Changing Hudson Project, 3 pages, retrieved from: < URL: https://www.caryinstitute.org/sites/default/files/public/downloads/curriculum-project/zebra_mussel_fact_sheet.pdf >, accessed Jul. 31, 2018.
"Clams Muscle Out Zebra Mussels," Science, American Association for the Advancement of Science, Oct. 31, 1997, 2 pages, retrieved from: < URL: https://www.sciencemag.org/news/1997/10/clams-muscle-out-zebra-mussels >.
"Temperature-dependent toxicity of molluscicides to zebra mussels," US Geological Survey Upper Midwest Environmental Science Center, 7 pages, retrieved from: < URL: https://www.usgs.gov/centers/umesc/science/temperature-dependent-toxicity-molluscicides-zebra-mussels >, accessed Jul. 31, 2018.
"Chlorophyll a concentrations," OzCoasts, Australian Online Coastal Information, 12 pages, retrieved from: < URL: http://www.ozcoasts.gov.au/indicators/chlorophyll_a.jsp >, accessed Jul. 31, 2018.
"The Basics of Chlorophyll Measurement," Tech Note, YSI, 3 pages, retrieved from: < URL: https://www.ysi.com/File%20Library/Documents/Technical%20Notes/T606-The-Basics-of-Chlorophyll-Measurement.pdf >, accessed Jul. 31, 2018.
"Indicators: Chlorophyll a, What is Chlorophyll a?" National Aquatic Resource Surveys, US Environmental Protection Agency, Aug. 16, 2016, 2 pages, retrieved from: < URL: https://www.epa.gov/national-aquatic-resource-surveys/indicators-chlorophyll >.
"Chlorophyll-A Criteria for Public Water Supply Lakes or Reservoirs," Water Quality Standards White Paper, Kansas Department of Health and Environment, Bureau of Water, Jan. 10, 2011, 12 pages, retrieved from: < URL: http://www.kdheks.gov/water/download/tech/Chlorophylla_final_Jan27.pdf>.
Al-Naimi et al., "Investigating chlorophyll and nitrogen levels of mangroves at Al-Khor, Qatar: an integrated chemical analysis and remote sensing approach," Environ Monit Assess, Apr. 5, 2016;188(5):268, 2 pages, retrieved from: < URL: https://www.ncbi.nim.nih.gov/pubmed/27048493 >, < DOI: 10.1007/s10661-016-5269-4 >. (abstract only attached).
Benson, Amy J., "The Exotic Zebra Mussel," US Fish and Wildlife Service, 3 pages, retrieved from: < URL: https://www.fws.gov/midwest/Endangered/clams/zebra.html >, accessed Jul. 31, 2018.
Zebra Mussel (*Dreissena polymorpha*)—Species Profile, US Geological Survey, 14 pages, retrieved from: < URL: https://nas.er.usgs.gov/queries/FactSheet.aspx?speciesID=5 >, accessed Jul. 31, 2018.
Parameters of Water Quality Interpretation and Standards, Environmental Protection Agency, "19. Chlorophyll", pp. 41-42, Ireland, (2001), retrieved from: < URL: https://www.epa.ie/pubs/advice/water/quality/Water_Quality.pdf>.
"Quagga and Zebra Mussels," US Department of the Interior Bureau of Reclamation, 5 pages, retrieved from: < URL: https://www.usbr.gov/mussels/ >, accessed Jul. 31, 2018.
Divittorio et al., "Inspection and Cleaning Manual for Equipment and Vehicles to Prevent the Spread of Invasive Species," Reclamation Managing Water in the West, US Deparlmnent of the Interior Bureau of Reclamation, Technical Memorandum No. 86-68220-07-05, Jun. 2012, pp. C-103-C-111, retrieved from: < URL: https://www.usbr.gov/mussels/prevention/docs/EquipmentInspectionandCleaningManual2012.pdf >.
"Safeguarding the West from Invasive Species: Actions to Strengthen Federal, State, and Tribal Coordination to Address Invasive Mussels," Reports & Statistics from PPA, Invasive Species, US Department of the Interior (Jun. 2017) 10 pages, retrieved from: < URL: https://www.doi.gov/sites/doi.gov/files/uploads/safeguarding_the_west_from_invasive_species.pdf >.
Banerjee, Rinita, "How to effectively control zebra mussels," Environmental & Science Engineering Magazine, May 9, 2016, 3 pages, retrieved from: < URL: https://esemag.com/water/how-to-effectively-control-zebra-mussels/ >.

"Bloat prevention in pasture fed beef cattle," Agriculture Victoria (Jan. 2007), 4 pages, retrieved from: < URL: http://agriculture.vic.gov.au/agriculture/pests-diseases-and-weeds/animal-diseases/beef-and-dairy-cows/bloat-prevention-in-pasture-fed-beef-cattle >, accessed Jul. 31, 2018.
"Invasive Species, Examining Invasive Species Policy," Statement of Jamie K. Reaser, Executive Director, National Invasive Species Council Before the House Committee on Oversight and Government Reform Interior Subcommittee Regarding Federal Agency Coordination on Invasive Species, US Department of the Interior Office of Congressional and Legislative Affairs, Dec. 1, 2015, 12 pages, retrieved from: < URL: https://www.doi.gov/ocl/invasive-species >.
Gray, John. C. "Understanding Photosynthesis: How Does Chlorophyll Absorb Light Energy?" Science and Plants for Schools, Department of Plant Sciences, University of Cambridge, UK, 7 pages, retrieved from: < URL: http://www.saps.org.uk/secondary/teaching-resources/283-photosynthesis-how-does-chlorophyll-absorb-light-energy >, accessed Jul. 31, 2018.
Nordsieck, Robert, "The Living World of Molluscs," 2 pages, retrieved from: < URL: http://www.molluscs.at/ >, accessed Jul. 31, 2018.
Mulls et al., "A Review of the Biology and Ecology of the Quagga Mussel (*Dreissena bugensis*), a Second Species of Freshwater Dreissenid Introduced to North America," Amer. Zool., 36:271-286 (1996), 16 pages, retrieved from: < URL: https://academic.oup.com/icb/article/36/3/271/203957 >, < DOI: 10.1093/icb/36.3.271 >.
Quagga Mussel (*Dreissena rostriformis bugensis*)—Species Profile, US Geological Survey, 6 pages, retrieved from: < URL: https://nas.er.usgs.gov/queries/factsheet.aspx?speciesid=95 >, accessed Jul. 31, 2018.
Zebra Mussels | Quagga Mussel, Alberta Invasive Species Council (Jan. 2014), 6 pages, retrieved from: < URL: https://abinvasives.ca/wp-content/uploads/2017/11/FS-ZebraQuaggaMussels.pdf>.
"Available Methods for Invasive Mussel Control Quagga and Zebra Mussels," Reclamation Managing Water in the West, US Department of the Interior Bureau of Reclamation, May 2015, 10 pages, retrieved from: < URL: www.usbr.gov/mussels/control/docs/musselcontrol.pdf >.
Olonscheck et al., "Decomposing the effects of ocean warming on chlorophyll a concentrations into physically and biologically driven contributions," Environmental Research Letters, Mar. 21, 2013, vol. 8, No. 1, 10 pages, retrieved from: < URL: https://iopscience.iop.org/article/10.1088/1748-9326/8/1/014043/pdf>, < DOI: 10.1088/1748-9326/8/1/014043 >.
Shankman et al., "The Most Powerful Evidence Climate Scientists Have of Global Warming," Inside Climate News, Oct. 3, 2017, 7 pages, retrieved from: < https://insideclimatenews.org/news/03102017/infographic-ocean-heat-powerful-climate-change-evidence-global-warming?gclid=EAlalQobChMlidv35uPe3AIV1EwNCh12VwvNEAAYASAAEgLO4_D_BwE >.
Ivanova et al., "Leaf acclimation to experimental climate warming in meadow plants of different functional types," Russian Journal of Plant Physiology, 2016, 63, 849-860, 13 pages, retrieved from: < URL: https://link.springer.com/article/10.1134/S10214437160 5006X >, < DOI: 10.1134/S102144371605006X >. (abstract only attached).
Hawkins et al., "Comparative Feeding on Chlorophyll-Rich Versus Remaining Organic Matter in Bivalve Shellfish," Journal of Shellfish Research, 32(3):883-897 (2013), 15 pages, retrieved from: < URL: https://bioone.org/journals/jounal-of-shellfish-research/volume-32/issue-3/035.032.0332/Comparative-Feeding-on-Chlorophyll-Rich-Versus-Remaining-Organic-Matter-in/10.2983/035.032.0332.short >, < DOI: 10.2983/035.032.0332 >. (abstract only attached).
"Clams Muscle Out Zebra Muscles," Science, AAAS, Oct. 31, 1997, retrieved from: < URL: https://www.sciencemag.org/news/1997/10/clams-muscle-out-zebra-mussels >.
Ramsayer, Kate, "The changing colors of our living planet," NASA Global Climate Change, Nov. 13, 2017, 11 pages, retrieved from: < URL: https://climate.nasa.gov/news/2652/the-changing-colors-of-our-living-planet/ >.

(56) References Cited

OTHER PUBLICATIONS

"Global Chlorophyll," NASA Earth Observatory, 2 pages, retrieved from: < URL: https://earthobservatory.nasa.gov/images/4097/global-chlorophyll >, accessed Jul. 31, 2018.

Chen, Angela, "Plants can be engineered to help fight the effects of climate change," The Verge, Nov. 17, 2016, 3 pages, retrieved from: < URL: https://www.theverge.com/2016/11/17/13654424/plants-carbon-dioxide-global-warming-photosynthesis-climate-change >.

Safety Data Sheet, ZebraCide-SE, published Mar. 2, 2020, 16 pages, retrieved from: < URL: https://zebramusselspesticide.com/wp-content/uploads/2021/01/ZebraCide-SE_Safety_Data_Sheet.pdf >.

* cited by examiner

METHODS AND SYSTEMS FOR CONTROLLING INVASIVE MUSSEL SPECIES

CROSS-REFERENCE TO RELATED APPLICATIONS

The present application is a continuation-in-part application of U.S. patent application Ser. No. 16/271,523, filed Feb. 8, 2019, entitled METHODS AND SYSTEMS FOR CONTROLLING INVASIVE MUSSEL SPECIES, which is itself a Continuation-in-part application of U.S. patent application Ser. No. 16/117,819, filed Aug. 30, 2018, entitled METHODS AND SYSTEMS FOR CONTROLLING INVASIVE MUSSEL SPECIES, each of which is incorporated by reference in their entireties herein.

BACKGROUND OF THE INVENTION

Field of the Invention

The present invention is generally directed to chlorophyll water treatments effective for killing or preventing the spread of invasive mussel species.

Description of the Prior Art

*Dreissenid* mussels, also known as Zebra Mussels & Quagga Mussels, are one of the most biological invasive species in North American waters. Zebra mussels are notorious for their biofouling capabilities by colonizing water supply pipes of hydroelectric and nuclear power plants, public water supply plants, and industrial facilities. They colonize pipes constricting flow, therefore reducing the intake in heat exchangers, condensers, fire-fighting equipment, and air conditioning and cooling systems. Navigational and recreational boating can be affected by increased drag due to attached mussels. Small mussels can get into engine cooling systems causing overheating and damage. Navigational buoys have been sunk under the weight of attached zebra mussels. Fishing gear can be fouled if left in the water for long periods. Deterioration of dock pilings has increased when they are encrusted with zebra mussels. Continued attachment of zebra mussels can cause corrosion of steel and concrete affecting its structural integrity.

Containment of invasive mussels can be difficult and cost prohibitive, particularly when the volume of water to be treated is large. For example, a paper company plant located on Lake Michigan spent $1.4 million for removal of zebra mussels from 400 cubic yards near plant equipment. Some current methods of controlling invasive mussels include chemical, bromine, quaternary and poluquaternary ammonium compounds, aromatic hydrocarbons, copper (heavy metal), endothall, zequanox, coatings, UV light, filtration, mechanical, and operational.

What is needed is an improved, low-cost method of treating and controlling the spread of invasive mussel species.

SUMMARY OF THE INVENTION

In one embodiment of the present invention, there is provided a method of controlling the spread of an invasive mussel species, and particularly a *Dreissenid* mussel species. The method comprises introducing a nonnative source of chlorophyll to a body of water comprising the invasive mussel species. The nonnative source of chlorophyll is introduced at an amount sufficient to provide a concentration of chlorophyll in the body of water of at least about 10 µg/L. The body of water has a pH of about 7 to about 8 after introducing the nonnative source of chlorophyll.

In another embodiment, there is provided a method of controlling the spread of an invasive *Dreissenid* mussel species. The method comprises introducing a nonnative source of chlorophyll to a body of water comprising the invasive mussel species. The nonnative source of chlorophyll is introduced at an amount sufficient to provide a concentration of chlorophyll in the body of water of at least about 10 µg/L. The nonnative source of chlorophyll comprises a material selected from the group consisting of cyanobacteria, alfalfa, soy beans, wheat grass, wheat straw, barley grass, mulberry, chlorella, sea weed, fresh water moss, spirulina, and mixtures thereof.

DETAILED DESCRIPTION OF THE PREFERRED EMBODIMENT

Figure 1:
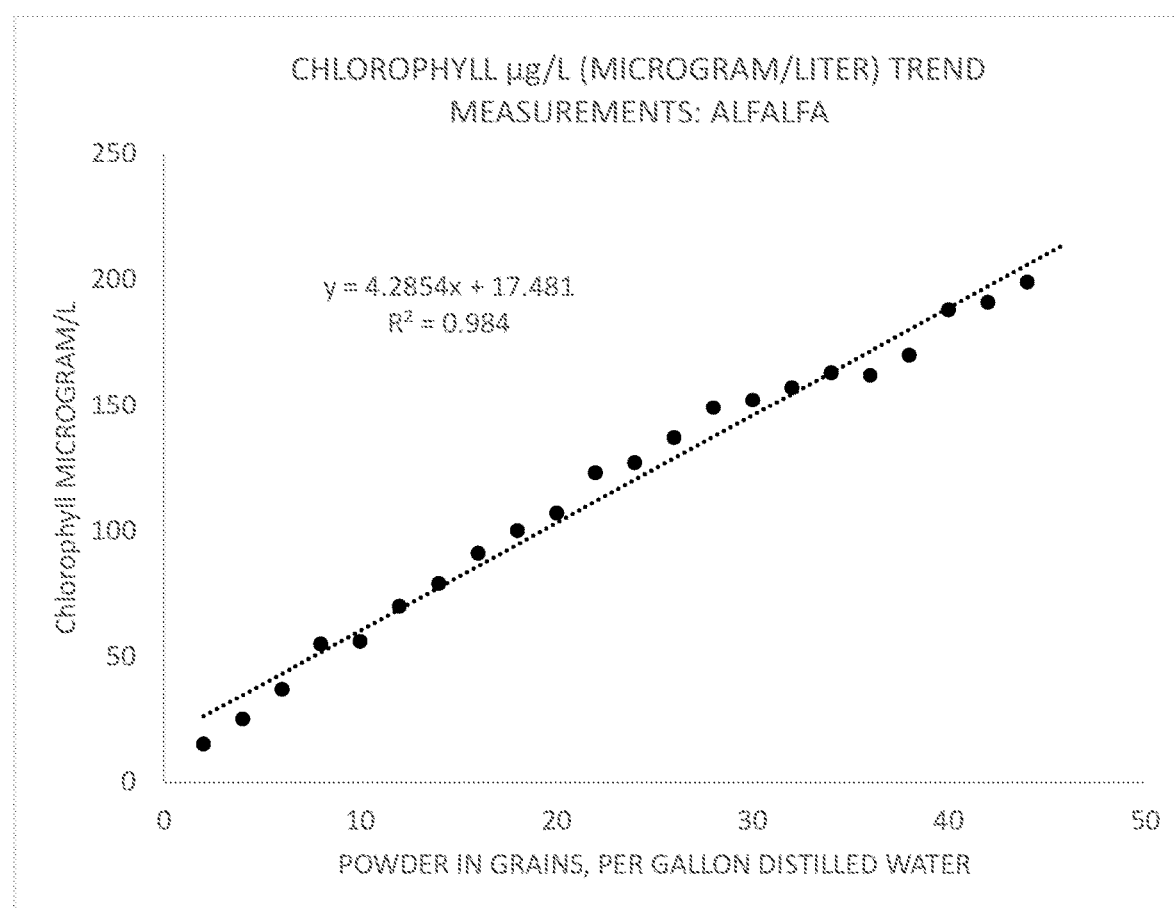
FIG. 1 is a graph showing measured chlorophyll concentrations at various amounts of alfalfa powder added to distilled water.

The present invention is generally directed to methods and systems for killing, preventing, or inhibiting the growth and spread of invasive *Dreissenid* mussel species, such as Zebra mussels (*Dreissena polymorpha*) and Quagga mussels (*Dreissena rostriformis bugensis*), by treating bodies of water comprising the mussels with a nonnative source of chlorophyll. Chlorophyll is a group of green pigments present in cyanobacteria and in the chloroplasts of plants and algae that absorb light for photosynthesis. There are five types of chlorophyll: chlorophyll a, which is present in all photosynthetic organisms except bacteria; chlorophyll b, in plants and green algae; and chlorophylls c, d and e, in some algae. As used herein, the term "nonnative" refers to a source of chlorophyll that is not indigenous or naturally present in the body of water being treated. This can include aquatic and nonaquatic plants and/or other organisms (indigenous or otherwise) that have been artificially modified or processed (e.g., pulverized, blended, liquified, etc.) so as to be in a non-natural form before being introduced to the body of water. For example, leaves, stems, and/or other plant parts may be harvested from aquatic and/or nonaquatic plants and artificially processed to form the nonnative source of chlorophyll. In certain embodiments, the nonnative source of chlorophyll comprises a material selected from the group consisting of cyanobacteria, alfalfa, soy beans, wheat grass, wheat straw, barley grass, mulberry, chlorella, sea weed, fresh water moss, spirulina, animalia feces, and mixtures thereof. In particularly preferred embodiments, the nonnative source of chlorophyll comprises a material collected from the body of water to be treated. In certain embodiments, the nonnative source of chlorophyll is provided in a form selected from the group consisting of vapor, liquid, paste, powder, pellets, cubes, blocks (both immediate or time release), animalia food, and combinations thereof. In particularly preferred embodiments, the source of chlorophyll is in liquid form. In particularly preferred embodiments, the source of chlorophyll is in powder form (either dry powder or suspended in liquid).

In certain preferred embodiments, the nonnative source of chlorophyll comprises an aquatic or nonaquatic plant (including algae species) or plant part that has been artificially processed. In such embodiments, certain considerations should be made during processing of the plant or plant part so as to release the aroma and taste of the plant while retaining its fibers and/or oils. In certain embodiments, the source of chlorophyll comprises processed plant particles (e.g., powder particles) having an average diameter of about 0.05 µm to about 650 µm, preferably about 0.2 µm to about 500 µm, and more preferably about 40 µm to about 400 µm. Without being bound by any theory, it is believed particles sizes within these ranges allow for normal ingestion and filtration by the mussels. The size can be determined at the time of application or after dissolving or breaking up when in contact with a liquid or water environment.

Flavoring and other additives may also be mixed with the nonnative source of chlorophyll, for example to encourage drinking by birds and other animalias or to impart preferred consistency and texture. In certain embodiments, the method further comprising introducing a flavoring along with the nonnative source of chlorophyll. The flavoring may be natural or synthetic. The flavoring can be introduced together with or separately from the nonnative source of chlorophyll and may similarly be provided in the form of vapor, liquid, paste, powder, pellets, cubes, blocks, and combinations thereof. In certain preferred embodiments, the flavoring comprises a natural flavoring, such as processed legume or foliage aroma (e.g., from soybean or clover), blended fish, and/or fish meal, that has been mixed with the nonnative source of chlorophyll to be introduced to the body of water. In certain embodiments, soured or spoiled flavoring sources should be avoided. Particularly preferred sources of flavoring include chlorophyll-a, which is believed to be particularly desirable to mussels. When flavoring is used, the invasive mussels can be killed at a faster rate. Without being bound by any theory, it is believed that the flavoring increases activity and intake of nutrients, including chlorophyll, by the mussels, which leads to increased blockage and suffocation by the filter feeding invasive mussels. Additionally, the nonnative source of chlorophyll may be mixed with natural or synthetic binders, such as cellulose, lignin, and/or other polymer binders.

In certain embodiments, a fibrous material is mixed with the nonnative source of chlorophyll. In certain preferred embodiments, the fibrous material is a cellulosic fibrous material. The fibrous material may be derived from a processed aquatic or nonaquatic plant, which can be the same plant providing the source of chlorophyll or a different plant. Other natural or synthetic fibrous materials may also be used. In certain embodiments, the fibrous material comprises fibers having an average length of about 0.05 µm to about 650 µm, preferably about 0.2 µm to about 500 µm, and more preferably about 40 µm to about 400 µm.

Methods of controlling the invasive mussel species comprise introducing the nonnative source of chlorophyll to a body of water comprising the invasive mussel species. The body of water may be an open or closed water system and may be internal or external environment. The body of water may include, but is not limited to, lakes, reservoirs, ponds, streams, rivers, processing facilities, and aquariums. As used herein, the "body of water" may refer to the entirety of the water contained within the system or only a localized portion of the water within the system, for example a localized portion of the water in the surrounding water proximate to the invasive mussel species. The body of water may also comprise one or more structures submerged in the body of water including, but not limited to, piping, pumps, inlets, outlets, ballast, piers, boats, and other structures both manmade and nature made. The body of water may also comprise natural and non-natural structures including, but not limited to, wood, cement, hard surfaces, mud, and remains of other mussels. Invasive mussel species often aggregate and grow on one or more of the above-noted structures in the body of water, and thus the nonnative source of chlorophyll is preferably introduced to the body of water at a location proximate to such structures.

The nonnative source of chlorophyll may be introduced to the body of water by a variety of methods including, for example, pouring, spreading, or spraying the nonnative source of chlorophyll onto the surface of the body of water, or injecting the nonnative source of chlorophyll into the body of water below the surface. In other embodiments, for example when the nonnative source of chlorophyll is provided as an animal food, the nonnative source of chlorophyll may be introduced to the body of water by feeding the nonnative source of chlorophyll to an animalia and allowing the animalia to defecate at a location proximate to the invasive mussel species.

The amount of nonnative chlorophyll introduced to the body of water can depend on a number of factors. In certain embodiments, the nonnative chlorophyll is introduced to the body of water so as to provide a chlorophyll concentration in the body of water at a concentration of at least about 10 µg/L. In certain embodiments, the nonnative chlorophyll is introduced to the body of water so as to provide a chlorophyll concentration in the body of water at a concentration of about 10 µg/L to about 900 µg/L, preferably about 15 µg/L to about 50 µg/L. However, in certain embodiments, much higher chlorophyll concentrations may be used. In certain such embodiments, the nonnative chlorophyll is introduced to the body of water so as to provide a chlorophyll concentration in the body of water at a concentration up to about 10,000 µg/L, up to about 16,000 µg/L (particularly when biomass cleanup is not a concern), up to about 50,000 µg/L, up to about 100,000 µg/L, up to about 130,000 µg/L (particularly when faster eradication is desired and/or little to no consideration for aquatic life and/or little to no consideration for residue in equipment), up to about 160,000 µg/L, or up to about 200,000 µg/L. In certain embodiments, the nonnative chlorophyll is introduced to the body of water so as to provide a chlorophyll concentration in the body of water at a concentration of about 10 µg/L to about 200,000 µg/L, preferably about 15 µg/L to about 160,000 µg/L. It should be understood that even higher chlorophyll concentrations may be used, depending on the particular application and solubility of the source of chlorophyll.

Additionally, the chlorophyll concentration and duration of the treatments can be selected so as to provide effective short-term or long-term kill. In certain preferred embodiments, the nonnative chlorophyll is introduced to the body of water so as to provide an average chlorophyll concentration in the body of water over the duration of treatment of about 15 µg/L to about 25 µg/L for about 3 to about 4 days. In certain preferred embodiments, the nonnative chlorophyll is introduced to the body of water so as to provide an average chlorophyll concentration in the body of water over the duration of treatment of about 20 μg/L to about 40 μg/L for about 1 to about 2 days. In certain preferred embodiments, the nonnative chlorophyll is introduced to the body of water so as to provide an average chlorophyll concentration in the body of water over the duration of treatment of at least about 40 μg/L for less than about 24 hours. Saturated concentrations of chlorophyll may also be used, depending on factors such as the presence of aquatic life and urgency of remedy. For example, the nonnative source of chlorophyll may be introduced so as to provide upper hypereutrophic levels of chlorophyll when aquatic life is not of concern. Additionally, in highly infested bodies of water (i.e., with a large number of zebra mussels within an area), greater concentrations of chlorophyll may be needed to achieve sufficient kill. Therefore, in certain embodiments, the nonnative chlorophyll is introduced to the body of water so as to provide a chlorophyll concentration in the body of water at a concentration of at least about 100 μg/L, at least about 200 μg/L, at least about 500 μg/L, at least about 1,000 μg/L, at least about 10,000 μg/L, at least about 16,000 μg/L, at least about 50,000 μg/L, at least about 100,000 μg/L, at least about 130,000 μg/L, at least about 160,000 μg/L, or at least about 200,000 μg/L.

The efficacy of the treatment methods can be dependent on several variances including, but not limited to, water temperature, salinity, toxins, oxygen level, age of mussels, current flow, turbidity, and pH. For example, older mussels can be killed at lower chlorophyll doses. The turbidity and pH of the water can impact both the efficacy of controlling invasive mussels as well as the survival of desirable aquatic life. In certain embodiments, the turbidity of the body of water is maintained at about 5 to about 500 ppm. In certain embodiments, and pH of the water is maintained at about 7 to about 8.

As noted above, the nonnative source of chlorophyll can comprise a material collected from the body of water to be treated. Therefore, in certain embodiments, the methods further comprise collecting an aquatic plant and/or algae material from the body of water and artificially processing the material before introducing the material into the body of water as the nonnative source of chlorophyll. For example, in certain such embodiments, the collected aquatic plant and/or algae is ground or blended into particulates. This artificial processing advantageously allows for increased exposure of the chlorophyll content within the plant or algae when re-introduced into the body of water. The artificial processing may further comprising mixing the material with flavorings or other additives, as discussed above, before re-introducing the material to the body of water.

In certain embodiments, the method further comprises monitoring the chlorophyll concentration of the body of water. The monitoring can be performed with a permanent monitor (e.g., installed at a permanent location in the body of water) or by intermittent manual readings. Monitoring the chlorophyll concentration at the body of water can be used to determine the amount and intervals of treatments with the nonnative source of chlorophyll to maintain a predetermined chlorophyll concentration to effect kill or prevention of the invasive mussel species.

Embodiments of the present invention are also directed to systems for controlling the growth and spread of invasive mussel species. The systems generally comprise a dosing station configured to introduce the nonnative source of chlorophyll (and any additional components described above) to the body of water. In certain embodiments, the system further comprises a chlorophyll concentration monitor residing in the body of water and configured to measure the concentration of chlorophyll at a location in the body of water. The dosing station can comprise a reservoir for storing the nonnative source of chlorophyll and an outlet for introducing the nonnative source of chlorophyll to the body of water. The outlet can be configured to introduce the nonnative source of chlorophyll, for example, by pouring, spreading, or spraying the nonnative source of chlorophyll onto the surface of the body of water, or injecting the nonnative source of chlorophyll into the body of water below the surface. The outlet may also be configured to provide an animalia feed comprising the nonnative source of chlorophyll to or around the body of water for consumption by animalias such as fish and waterfowl. The monitor may be any of a variety of chlorophyll concentration monitors known in the art. The system may further comprise a controller in communication with both the monitor and dosing station. In use, the controller instructs the dosing station to introduce an amount of the nonnative source of chlorophyll to the body of water so as to maintain the chlorophyll concentration in the body of water at a predetermined level as measured by the monitor. The dosing stations can be located anywhere that mussel kill or prevention is desired. In particular embodiments, the dosing station is located at one or more fresh water inlets. This allows chlorophyll concentrations to maintain necessary high levels where lower levels of chlorophyll are generally present.

The particular form of the nonnative source of chlorophyll can be selected based on certain advantages for certain applications. For example, artificially modified or processed aquatic plants (e.g., grass or leaf plants) and/or algae may be advantageous so as to not inadvertently introduce other potentially invasive organisms to the body of water. Additionally, a plant leaf source compressed into a formation releases at a slower rate than powder or liquid forms, and thus such a source may be advantageous for slow-release applications. Spirulina and chlorella have a stronger affinity for osmosis into water than grasses or leaf substances with, and leaf substances seem to be eaten by fish more readily. Thus, in particular embodiments, the nonnative source of chlorophyll comprises spirulina and/or chlorella. In certain embodiments, the nonnative source of chlorophyll excludes grass and/or leaf plants. Chlorella has a higher concentration of chlorophyll than spirulina, which can be advantageous for closed areas, such as piping and equipment. Additionally, spirulina is larger in size than chlorella. Therefore, in certain embodiments, the nonnative source of chlorophyll comprises a mixture of chlorella (for smaller mussels) and spirulina (for larger particles and larger mussels). This mixture may also comprise a leaf source (such as alfalfa) that aquatic life readily consumes. Such a mixture can provide a multi-faceted approach to controlling the spread of invasive mussels. Mixtures of spirulina and alfalfa pellets were particularly advantageous for treatments in areas with aquatic life, as fish, snails, and insects can survive in high chlorophyll levels (30 μg/L-35 μg/L) when such mixtures are used.

In certain embodiments, the nonnative source of chlorophyll does not comprise heavy metals, such as copper, commonly used in prior art treatment methods. Heavy metals can be precursors to several neurological conditions and concentrations can increase over time in bodies of water treated with prior art methods. Therefore, in certain embodiments, the methods and systems advantageously do not comprise introducing a heavy metal to the body of water. Additionally, the use of pesticides has known and possibly unknown health risks to humans. Therefore, in certain embodiments, the methods and systems advantageously do not comprise introducing a pesticide to the body of water.

Additional advantages of the various embodiments of the invention will be apparent to those skilled in the art upon review of the disclosure herein and the working examples below. It will be appreciated that the various embodiments described herein are not necessarily mutually exclusive unless otherwise indicated herein. For example, a feature described or depicted in one embodiment may also be included in other embodiments, but is not necessarily included. Thus, the present invention encompasses a variety of combinations and/or integrations of the specific embodiments described herein.

As used herein, the phrase "and/or," when used in a list of two or more items, means that any one of the listed items can be employed by itself or any combination of two or more of the listed items can be employed. For example, if a composition is described as containing or excluding components A, B, and/or C, the composition can contain or exclude A alone; B alone; C alone; A and B in combination; A and C in combination; B and C in combination; or A, B, and C in combination.

The present description also uses numerical ranges to quantify certain parameters relating to various embodiments of the invention. It should be understood that when numerical ranges are provided, such ranges are to be construed as providing literal support for claim limitations that only recite the lower value of the range as well as claim limitations that only recite the upper value of the range. For example, a disclosed numerical range of about 10 to about 100 provides literal support for a claim reciting "greater than or equal to about 10" (with no upper bounds) and a claim reciting "less than or equal to about 100" (with no lower bounds).

EXAMPLES

The following examples set forth various specific treatment methods for killing *Dreissenid* mussel colonies collected from an infested lake. It is to be understood, however, that these examples are provided by way of illustration and nothing therein should be taken as a limitation upon the overall scope of the invention.

Items and brands used for testing that were bought were: Chlorella, NOW Foods, Alfalfa Powder, NOW Foods, Certified Organic Wheat Grass, NOW Foods, Organic Spirulina Powder, Sunny Green Products, Barley Grass Bulk Powder, Nature's Way Brands, LLC, Wheat Grass Tablets, Sunny Green Products, Fresh Alfalfa Hay, Fresh Soy Bean Plants and Wheat Straw.

During the tests below, readings of chlorophyll concentration were taken 30 to 60 minutes after adding substances to either lake water or distilled water, unless indicated otherwise.

Example I

Locating a small body of water with an infestation of zebra Mussels, a rock was collected having a colony thereon and placed in an aquarium with fish. After a couple days, the water had become extremely clear, which was different than when 10 gallons of water was originally retrieved from the body of water where the zebra mussels were retrieved. The mussels were fed a chlorophyll-based food, spirulina, by adding a heaping table spoon into the 10-gallon fish tank. The amount of spirulina was enough to turn the water dark/bright green. A few days later, the mussels were open (indicating death). At 7 days, the tank was a smell of worsening debris. The fish had died, likely due to the sudden change in the living environment. The water was drained, and the sample drenched in high concentration of bleach until the shells were bleached out.

Example II

Additional colonies of zebra mussels were collected and fed several other plant-based products comprising chlorophyll. Chlorophyll sources tested included: wheat grass, alfalfa powder, barley grass, chlorella, dried soy bean leaves, dried alfalfa leaves, and Spirulina. All zebra mussels died similar to Example I above. It was determined that the chlorophyll of the plant-based products was killing the zebra mussels.

Example III

Chlorophyll levels were measured at locations in bodies of water that were known to be completely infested, partially infested, and not infested (thought to be non-infested because no boating activity allowed). Fluorescence readings taken to estimate chlorophyll levels were as follows:

i) complete infestation at 3 µg/L;

ii) broadly infested but incomplete at 7 µg/L;

iii) one lake infestation near inlet but not the shoreline of the bowl of the lake at 15 µg/L to 25 µg/L (with smell); and iv) no apparent infestation at 17 µg/L.

Based on this, it was concluded that chlorophyll levels can be used to determine likelihood of mussels spreading or presence. Notably, gold fish living with dead zebra mussels more than doubled in size within 6 weeks. Therefore, it is believed that aquatic life will flourish where mussel control is initiated.

Example IV

Further lab testing was performed to measure the effect of chlorophyll concentration on killing zebra mussel colonies. A Fluorosense Meter from Turner Designs was used to determine the actual readings that had been used previously by measuring both grain weight and µg/L presence of chlorophyll. Material used to calibrate was also obtained, Fluorosense Chlorophyll Standard Solution, provided by Turner Designs, P/N 2860-220. Equipment included: 1-50-gallon aquarium, 1-10-gallon aquarium, 40×-600× microscope, 3.5×-90× microscope, hydrometer, test tubes, numerous air and water pumps, precision (grain) and bulk pounds' scales, food blenders, ECO Testr Turbidity Meter, HM Digital pH Meter, Turner Designs Flurosense—Chlorophyll Meter, Microscope Camera, 22 1-gallon fish bowls, 15 5-gallon buckets, 2 65-gallon barrels and numerous miscellaneous equipment.

Several tests were performed by measuring weights of products to determine death prior to receiving equipment to evaluate the estimated chlorophyll levels in µg/L, giving the bases to follow up on using the meter readings. The chlorophyll concentrations and turbidity resulting from 12 grain (weight) of various products added to 2 liters of distilled water are provided in Table 1 below.

TABLE 1

| Product | Start Chlorophyll µg/L | Start Turbidity PPM | 1 Hour Chlorophyll µg/L | 1 Hour Turbidity PPM | Morning (Approximately 12 hours later) Chlorophyll µg/L | Morning (Approximately 12 hours later) Turbidity PPM |
|---|---|---|---|---|---|---|
| Spirulina | 113 | 10 | 102 | 10 | 84 | 10 |
| Alfalfa Powder | 66 | 20 | 22 | 20 | 13 | 20 |
| Wheat Grass Powder | 45 | 20 | 25 | 10 | 15 | 10 |
| Barley Grass Powder | 35 | 20 | 25 | 20 | 15 | 20 |
| Chlorella | 25 | 10 | 26 | 10 | 22 | 10 |

Various sources of chlorophyll were tested at various concentration ranges by placing live colonies of zebra mussels in 1-gallon containers filled with either lake water (having average chlorophyll concentration of 1 to 3 µg/L) or distilled water. The source of chlorophyll was then added to the container and dissolved. The time required to kill the zebra mussel colonies was determined by tapping the open mussels and observing the response. The results are provided in Tables 2-9, below.

TABLE 2

Infested Lake Water.

| Source of Chlorophyll | Chlorophyll Concentration Range | | Time to Death (hours) |
|---|---|---|---|
| Spirulina | 12 µg/L | 22 µg/L | <72 |
| Alfalfa Powder | 12 µg/L | 22 µg/L | <72 |
| Alfalfa Fresh Blended | 12 µg/L | 22 µg/L | <72 |
| Soy Bean Fresh Blended | 12 µg/L | 22 µg/L | <96 |
| Barley Grass Powder | 12 µg/L | 22 µg/L | <96 |
| Wheat Grass Powder | 12 µg/L | 22 µg/L | <96 |
| Chlorella | 12 µg/L | 22 µg/L | <72 |

TABLE 3

Distilled Water.

| Source of Chlorophyll | Chlorophyll Concentration Range | | Time to Death (hours) |
|---|---|---|---|
| Spirulina | 12 µg/L | 22 µg/L | <72 |
| Alfalfa Powder | 12 µg/L | 22 µg/L | <72 |
| Alfalfa Fresh Blended | 12 µg/L | 22 µg/L | <72 |
| Soy Bean Fresh Blended | 12 µg/L | 22 µg/L | <96 |
| Barley Grass Powder | 12 µg/L | 22 µg/L | <96 |
| Wheat Grass Powder | 12 µg/L | 22 µg/L | <96 |
| Chlorella | 12 µg/L | 22 µg/L | <72 |

TABLE 4

Infested Lake Water.

| Source of Chlorophyll | Chlorophyll Concentration Range | | Time to Death (hours) |
|---|---|---|---|
| Spirulina | 22 µg/L | 35 µg/L | <48 |
| Alfalfa Powder | 22 µg/L | 35 µg/L | <48 |
| Alfalfa Fresh Blended | 22 µg/L | 35 µg/L | <48 |
| Soy Bean Fresh Blended | 22 µg/L | 35 µg/L | <72 |
| Barley Grass Powder | 22 µg/L | 35 µg/L | <72 |
| Wheat Grass Powder | 22 µg/L | 35 µg/L | <72 |
| Chlorella | 22 µg/L | 35 µg/L | <48 |

TABLE 5

Distilled Water.

| Source of Chlorophyll | Chlorophyll Concentration Range | | Time to Death (hours) |
|---|---|---|---|
| Spirulina | 22 µg/L | 35 µg/L | <48 |
| Alfalfa Powder | 22 µg/L | 35 µg/L | <48 |
| Alfalfa Fresh Blended | 22 µg/L | 35 µg/L | <48 |
| Soy Bean Fresh Blended | 22 µg/L | 35 µg/L | <72 |
| Barley Grass Powder | 22 µg/L | 35 µg/L | <72 |
| Wheat Grass Powder | 22 µg/L | 35 µg/L | <72 |
| Chlorella | 22 µg/L | 35 µg/L | <48 |

TABLE 6

Infested Lake Water.

| Source of Chlorophyll | Chlorophyll Concentration Range | | Time to Death (hours) |
|---|---|---|---|
| Spirulina | 35 µg/L | 60 µg/L | <24 |
| Alfalfa Powder | 35 µg/L | 60 µg/L | <24 |
| Chlorella | 35 µg/L | 60 µg/L | <24 |

TABLE 7

| | Distilled Water. | | |
|---|---|---|---|
| Source of Chlorophyll | Chlorophyll Concentration Range | | Time to Death (hours) |
| Spirulina | 35 µg/L | 60 µg/L | <24 |
| Alfalfa Powder | 35 µg/L | 60 µg/L | <24 |
| Chlorella | 35 µg/L | 60 µg/L | <24 |

TABLE 8

| | Infested Lake Water. | | |
|---|---|---|---|
| Source of Chlorophyll | Chlorophyll Concentration Range | | Time to Death (hours) |
| Spirulina | 60 µg/L | 199+ µg/L | ≈8 |
| Alfalfa Powder | 60 µg/L | 199+ µg/L | ≈8 |
| Chlorella | 60 µg/L | 199+ µg/L | ≈8 |

TABLE 9

| | Distilled Water. | | |
|---|---|---|---|
| Source of Chlorophyll | Chlorophyll Concentration Range | | Time to Death (hours) |
| Spirulina | 60 µg/L | 199+ µg/L | ≈8 |
| Alfalfa Powder | 60 µg/L | 199+ µg/L | ≈8 |
| Chlorella | 60 µg/L | 199+ µg/L | ≈8 |

It should be considered that fish are able to tolerate higher levels of chlorophyll if introduced through a time period, instead of a sudden influx to reach the chlorophyll level for zebra mussel death. Additionally, it was observed in the study above that leaf plants seem to have a greater impact on controlling mussels than grasses. Leaf plants are considered a benefit to aquatic life because leave plants are most often considered better food sources for fish.

Example V

Some prior art has suggested that zebra mussels may be killed by ducks and geese, for example by ingesting the mussels. Visual observation was performed along lake shores where water fowl moved their habitat around the lake because of grass and clover. The zebra mussels were dead in the areas of travel, but not in the immediate vicinity of the waterfowl. Notably, the shells of the zebra mussels were still intact and attached. This would suggest that the mussels were not eaten by the waterfowl. Additionally, the zebra mussel deaths did not appear due to foot traffic of the waterfowl because the depth of water exceeded the capability of foot contact. Further observation noticed a green tint to the defecation left on the shore. Based on these observations, waterfowl defecation was tested for chlorophyll levels and use for killing zebra mussel colonies.

Fresh waterfowl defecation was collected and placed in distilled water to discover readings of chlorophyll above 199 µg/L. Placing zebra mussels in this water resulted in death within less than 24 hours. See Table 10 below.

TABLE 10

| Source | Notes | Concentration in Distilled Water | Turbidity | pH | Time To Death As Determined by Tapping Open Mussels |
|---|---|---|---|---|---|
| Duck Defecation Dry | Approximately ⅛ cup in gallon of water | >199 µg/L | 350 ppm | 7.5 | <24 Hours |

Following the results above, additional waterfowl defecation was collected. The dried defecation was dissolved until a 40 µg/L estimated chlorophyll concentration was obtained. At that time, a rock with a colony of zebra mussels was placed in the body of water, along with a bubble stone for an oxygen source. Within 20 hours, the zebra mussel population was dead. See Table 11.

TABLE 11

| Source | Notes | Concentration in Distilled Water | Turbidity | pH | Time To Death As Determined by Tapping Open Mussels |
|---|---|---|---|---|---|
| Duck Defecation Dry | One dropping approximately 2" long, in gallon of water | 40 µg/L | 270 ppm | 7.8 | <24 Hours |

Notably, spiral snails collected while collecting zebra mussels had no response to the higher chlorophyll levels. Passing $CO_2$ gases through an air stone into the chlorophyll concentrations did not have any effect on the chlorophyll readings.

Example VI

A quart container of a mixture of alfalfa pellets, alfalfa powder, spirulina powder and sugar was placed in a lake near shore line. Weather conditions were windy with water craft waves hitting the shore line. Later in the day (approximately 2 hours), rain fell. The test was still considered successful, as the zebra mussels in the immediate area were found to be unresponsive 7 hours later and still unresponsive 30 hours later. This suggests that high saturation for short periods of time can be effective for killing zebra mussels.

Example VII

Additional lab testing was performed with water extracted from a lake. Water extracted from the lake with chlorophyll concentrations averages of 20 µg/L to 25 µg/L resulted in death in less than 48 hours, although the chlorophyll concentration level had to be rejuvenated as the chlorophyll levels dropped during the period. Readings taken over the 48-hour period were:
  25 µg/L (lake water);
  9 µg/L (24 hours);
  20 µg/L (reading after low levels of chlorophyll was replaced); and
  7 µg/L (at the end of 48 hours).
This resulted in death in less than 48 hours after introduction. Based on this, it is believed the chlorophyll concentration can determine an estimated time for death, for example: 15-25 µg/L for 3 to 4 days of exposure; 20-40 µg/L 1 to 2 days of exposure; and above 40 µg/L for less than 24 hours.

Example VIII

Initial observations in Example VII were run using lake water, but there was some concern with variations in results. Tests were run with both lake water and distilled water to confirm consistency and also to confirm that the combination of material in the lake water was not creating an unknown chemical reaction that could be killing the ZMs. Therefore, a similar study was performed in distilled water and a comparison found that distilled water provided the same results.

Example IX

Blended fresh soy bean leaves were added to distilled water at an estimated concentration of 150 µg/L & 10 ppm turbidity. A colony of zebra mussels were added attached to a rock. After 24 hours, there was response from partially opened zebra mussels. Time to kill was approximately 36 hours. See Table 12.

TABLE 12

| Source | Notes | Concentration in Distilled Water | Turbidity | pH | Time To Death As Determined by Tapping Open Mussels |
|---|---|---|---|---|---|
| Fresh Ground Soy Bean Leaves | Blended in blender reducing with water | 150 µg/L | 10 ppm | 7.4 | ≈36 hours |

Example X

Evaluated mixtures of alfalfa powder of 20 grain per gallon and 20 grain and 4 grain sugar. Later in the day, the alfalfa/powder mixture resulted in zebra mussels open slightly but responsive to touch, while alfalfa powder only resulted in zebra mussels not open upon observation. See Table 13.

TABLE 13

| Treatment | Comments | Time to Death |
|---|---|---|
| 20 grain Alfalfa Powder with 4 grain sugar (in 1-gallon water) | Put in mixture for 3 hours then put in clear water | <36 hours |
| 20 grain Alfalfa Powder with 20 grain sugar (in 1-gallon water) | Also killed algae | <24 hours |

Example XI

Additional testing was performed, as described along with the results in Table 14, below.

TABLE 14

| Treatment | Comments | Time to Death |
|---|---|---|
| ⅔ Pellet Alfalfa, ⅙ Powder Alfalfa and ⅙ Spirulina | Drop mixture of 32 ounce cup into lake water, conditions windy, boating waves and shower afterwards. Immediate area of Zebra Mussels were non responsive after 7 hours | <7 hours |
| Alfalfa Pellets (15 grain) | Slow dissipation allowing fish to live, because of slow change in Chlorophyll Levels | <48 hours |
| Alfalfa Powder or Spirulina to chlorophyll levels of 35 µg/L to 45 µg/L | Place fish in when levels at 25 µg/L or above resulted in quick death of gold fish. | <12 hours |
| Alfalfa Pellets to allow melting | Gold fish and Zebra mussels in place from start while melting pellets, chlorophyll levels above 30 µg/L reached. Fished lived several weeks before removing still live. Fish were quicker to respond after test was completed. Noticed that fish ate the alfalfa product during test. | <36 hours |
| Alfalfa Pellets dusted with Spirulina | Placed both fish and zebra mussels into mixture at the beginning. Again, levels above 30 µg/L reached, and fish lived in the environment for several weeks until removed. | <36 hours |
| Lake water having high chlorophyll concentration | Two 5-gallon buckets were used, placing Zebra Mussels attached to rocks in each bucket. Initial lake water added measured 25 µg/L chlorophyll, 12 hours later chlorophyll levels measured 9 µg/L average. Replaced water with lake water measuring 20 µg/L, after 48 hours the chlorophyll levels measured 7 µg/L average. | <48 hours |

Example XII

Controlled specimens of zebra mussels were placed in both lake water and distilled water with recirculation pumps. The group with lake water was replenished with lake water as evaporation occurred. Distilled water was replenished with distilled water as needed. Zebra mussels lasted approximately 4 weeks in the distilled water, while zebra mussels lived for 6 to 8 weeks in the lake water environment. It is believed that starvation occurred with the distilled water, while the replenishing of lake water provided some nutrients.

Example XIII

Additional testing was performed to study the effects on water and mussel kill of various treatments.

Kill testing was performed using 20 grain of various treatments in 2000 ml of distilled water. Table 15 shows the treatment type, the high/low chlorophyll concentration over 48 hours of testing (variation due to due to break down of material and cell rupture when hydrated), and the zebra mussel time to death (in hours).

TABLE 15

| Treatment | Low Chlorophyll | High Chlorophyll | Time to Death (h) |
|---|---|---|---|
| Ground Soy Bean Leaves | 44 µg/L | 199 µg/L | 24 |
| Ground Duck Defecation | 43 µg/L | 70 µg/L | 24 |

TABLE 15-continued

| Treatment | Low Chlorophyll | High Chlorophyll | Time to Death (h) |
|---|---|---|---|
| Ground Chicken Defecation | 15 µg/L | 36 µg/L | 10 |
| Distilled Water Only | 1 µg/L | 1 µg/L | No Death 3 Days Stopped |

Testing was performed to determine water conditions using 20 grain of various treatments in 2000 ml of distilled water. Table 16 shows the treatment type, the high/low chlorophyll concentration over 48 hours of testing (variation due to due to break down of material and cell rupture when hydrated), turbidity, and pH.

TABLE 16

| Treatment | Low Chlorophyll | High Chlorophyll | Turbidity | pH |
|---|---|---|---|---|
| Ground Soy Bean Leaves | 50 µg/L | 111 µg/L | 50 | 7.9 |
| Bought Ground Alfalfa | 40 µg/L | 92 µg/L | 40 | 7.9 |
| Ground Duck Defecation | 32 µg/L | 49 µg/L | 40 | 7.8 |
| Ground Chicken Defecation | 10 µg/L | 11 µg/L | 50 | 7.4 |
| Ground White Paper | 2 µg/L | 4 µg/L | — | — |

Kill testing was performed using differing grain weights of various treatments in 2000 ml of distilled water. Table 17 shows the treatment type, the high/low chlorophyll concentration over 48 hours of testing (variation depended on stirred or settled), chlorophyll flotation, pH, and the zebra mussel time to death (in hours). See Table 17.

TABLE 17

| Treatment | Chlorophyll Not Stirred, µg/L | Chlorophyll Stirred, µg/L | Chlorophyll Flotation | Time to Death (hrs) | pH |
|---|---|---|---|---|---|
| 5 grain Soy Bean Leaf Powder | 10 | 58 | 17% | Approx 72 | 7.7 |
| 5 grain Soy Bean Leaf Powder w/5 Grain Dried Anchovy | 18 | 64 | 28% | Approx 72 | 7.6 |
| 10 Grain Soy Bean Leaf Powder | 24 | 135 | 18% | <48 | 7.7 |
| 10 Grain Soy Bean Leaf Powder w/5 Grain Dried Anchovy | 28 | 134 | 21% | <39 | 7.7 |
| 5 Grain Spirulina | 123 | 132 | 93% | <24 | 7.7 |
| 5 Grain Spirulina w/5 Grain Dried Anchovy | 76 | 86 | 88% | <6 | 7.7 |
| Distilled Water Only | 0 | 1 | | Stopped (Alive for Days) | 7.7 |

Testing was performed to determine the radiation benefit of chlorophyll being present in a body of water. As shown in Table 18, below, chlorophyll treatments increased the temperature of the water when exposed to sunlight. Higher levels of chlorophyll would not only absorb more energy in the winter, but also it provides more oxygen to the environment.

TABLE 18

| Treatment | Chlorophyll μg/L | Temp. (° F.) / Time | | | | |
|---|---|---|---|---|---|---|
| Soy Bean Leaf Powder | 15 | 74 @ 10:45am | 79 @ 11am | 95 @ 12pm | 98 @ 1pm | 104 @ 4pm |
| Distilled Water | 0 | 74 @ 10:45am | 78 @ 11am | 94 @ 12pm | 97 @ 1pm | 103 @ 4pm |
| Soy Bean Leaf Powder | >199 | 76 @ 11am | 89 @ 11am | 100 @ 12pm | 104 @ 1pm | 105 @ 4pm |
| Distilled Water | 0 | 76 @ 11am | 87 @ 11am | 96 @ 12pm | 100 @ 1pm | 101 @ 4pm |
| Spirulina Powder | 103 | 76 @ 11am | 87 @ 11am | 95 @ 12pm | 100 @ 1pm | 102 @ 4pm |
| Distilled Water | 0 | 76 @ 11am | 86 @ 11am | 93 @ 12pm | 97 @ 1pm | 98 @ 4pm |

Example XIV

During the above testing described in Examples I-XIII, additional observations were noted and are summarized below:
- Although chlorella is a more expensive treatment, it generally exhibited better acceptance in water testing.
- Wheat grass and barley grass settle very quickly, so difficult to keep suspended.
- Soy bean leaf powder tended to be more effective than alfalfa, which tended to be more effective than grasses.
- Spirulina tended to be more effective than all of the above, particularly for closed systems, but may be too expensive for large bodies of water.
- All treatment intake can be enhance by flavoring with tasteful food sources.
- Liquid treatments were preferable over powder, which were preferable over pellets, for administering.
- Gold fish, insects, and spiral snails lived as zebra mussels dies in same treated water (when the chlorophyll levels were gradually raised so as not to shock fish).

Example XV

Fresh water moss was collected from a lake infested with zebra mussels, and the moss was surrounding, floating above, and touching the zebra mussel colonies. The fresh water moss was collected and processed in a blender, similar to what was done with leaves in the examples above. Three treatment samples were prepared, with one flavored with anchovy. The three samples were added to separate bodies of water at approximately 7:00 pm. This resulted in chlorophyll readings greater than an estimated 199 μg/L at 8:00 pm. By 5:00 am the following morning, there were no responses by the open zebra mussels. Additionally, the chlorophyll level readings were 199 μg/L, 144 μg/L and 113 μg/L; it seemed that the number of Zebra Mussels within each container determine the final chlorophyll levels. Notably, spiral snails collected survived testing.

Example XVI

In view of the studies above, further investigation and observations were performed to better understand the mechanisms of mussel kill and control.

Observations

It was observed that *Dreissenid* mussel infestations were found in chlorophyll-a containing Oligotrophic and Mesotrophic areas of lakes, but not observed in Eutrophic through Hypereutrophic levels. It is believed that the *Dreissenid* mussels are unable to control their eating habits, causing suffocation/blockage in waters that have not been systematically filtered. This action is observed in partially infested lakes, where in areas with an inlet of clean water run-off zebra mussels were found to be plentiful, but in other areas no zebra mussels were found on docks or equipment where chlorophyll-a measured above 30 mg/L.

Discussion

Based on the observations above, it is believed that by increasing the aroma and taste of oligotrophic and mesotrophic waters where infestations of *Dreissenid* mussels can be found, the *Dreissenid* mussels are unable to control their eating habits, similar to many other animals that are provided food having strong, favorable taste or aroma. For example, this is seen with cattle. When allowed to overconsume feed, cattle will become bloated, a condition which is usually precipitated by the rapid consumption of lush legume pasture species and can lead to death. It is believed that *Dreissenid* mussels react to the same lush legume aroma and taste, as seen with soybean and clover foliage, which can be measured by the concentration of chlorophyll-a within the water. Notably, however, no other aquatic animals were observed to over-consume in the high chlorophyll-a containing eutrophic-hypertrophic conditions where the *Dreissenid* mussels were observed to react.

Testing

The observations were tested by first adding about a teaspoon of ground-up dried anchovies to a quart of water and allowing to sour, becoming very distasteful to the smell. Chlorophyll-a was added to the soured anchovy mixture in an amount sufficient to raise the concentration of chlorophyll in the subsequently treated water (see below) to about 30 μg/L. The mixture was added to a 10-gallon aquarium container holding water and a sample of approximately 40 live zebra mussels. Addition of the mixture resulted in closure of the zebra mussels. After four days, the soured anchovy mixture was removed and replaced with distilled water mixed with a processed plant product. The processed plant product raised the chlorophyll-a level in the distilled water, which acquired a more favorable aroma, resulting in opening of the zebra mussels and filtration feeding to begin. This led the mussels irresistibly over eating. This test confirms that the chlorophyll-a aroma and taste is more favorable than other products to the mussels, which leads to overeating and eventual death.

Plant Processing

In view of the testing and observations above, certain considerations should be made in the processing of plants to release the aroma and taste while retaining its fibers and/or oils. For example, processed plant particles (e.g., powder particles) should preferably be in a measurable range of about 0.05 to about 650 micrometers in all directions, more preferably ranging from about 0.2 to about 400 micrometers maximum in any direction to allow normal ingestion by the mussels. The size can be determined at the time of application or after dissolving or breaking up when in contact with a liquid or water environment that is introduced into water bodies where *Dreissenid* mussels inhabit.

Example XVII

Efficacy testing was conducted at chlorophyll concentrations above 200 μg/L. However, because the Chlorophyll Meter has an upper measurable limit of about 200 μg/L, higher concentrations were estimated by extrapolation.

Figure 2:
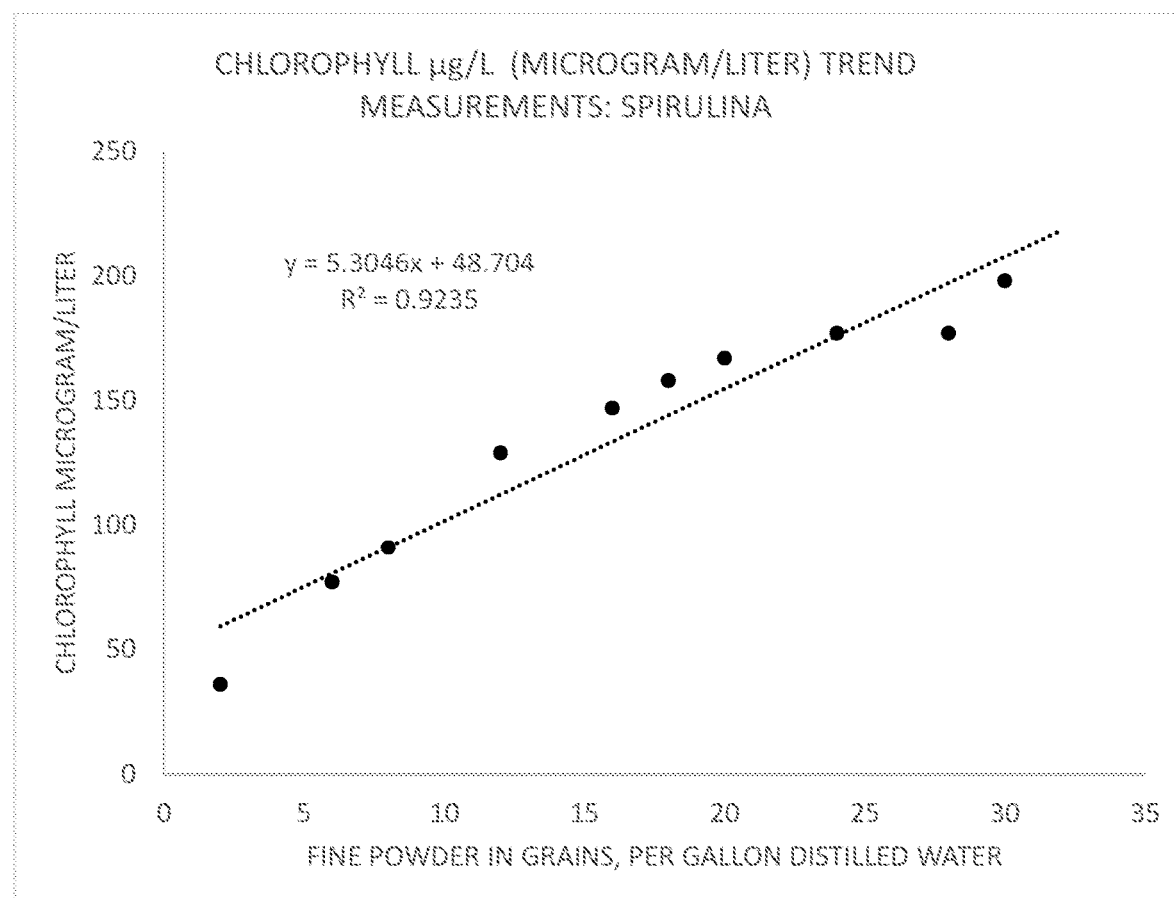
FIG. 2 is a graph showing measured chlorophyll concentrations at various amounts of spirulina powder added to distilled water.
Figure 3:
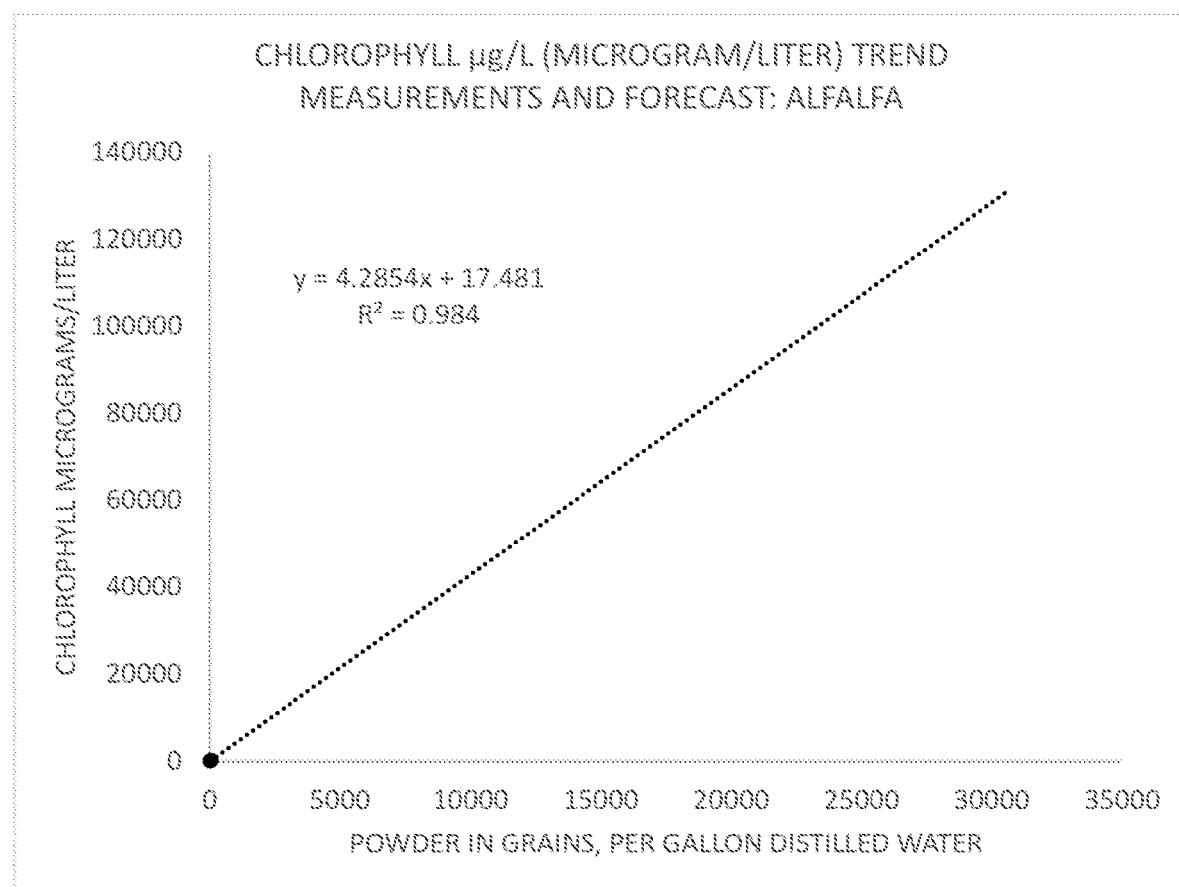
FIG. 3 is a graph showing the amount of alfalfa powder needed to obtain chlorophyll concentrations by extrapolation beyond the measurable limit using the trendline formed using the data points shown in FIG. 1.
Figure 4:
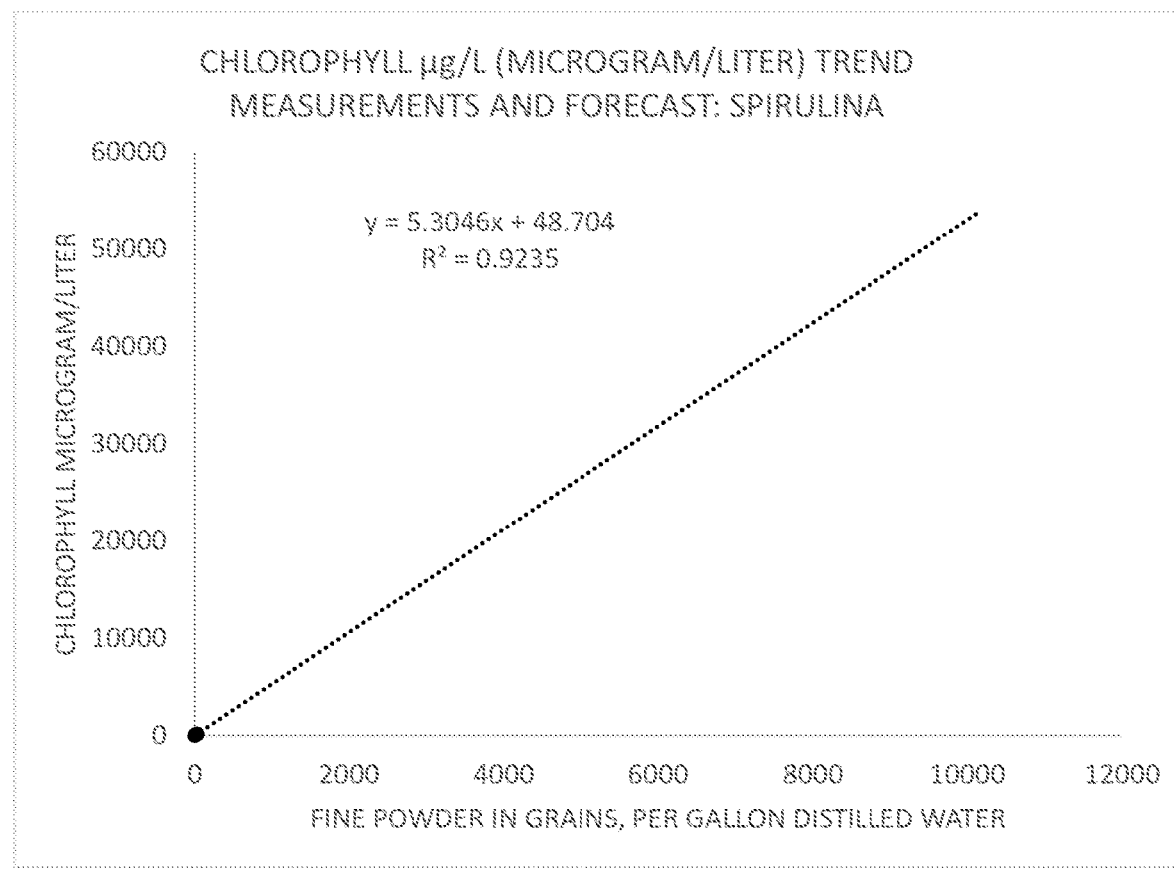
FIG. 4 is a graph showing the amount of spirulina powder needed to obtain chlorophyll concentrations by extrapolation beyond the measurable limit using the trendline formed using the data points shown in FIG. 2.

As shown in Table 19 below, grains of alfalfa powder (ground powder) and spirulina powder (finely ground powder) were added to distilled water two at a time and mixed, and chlorophyll concentration was measured. When the results were plotted, a general trendline was observed having an $R^2$ value of greater than 0.9 (See FIG. 1 and FIG. 2). Thus, the trendline can be extrapolated beyond the measurable limit of 200 μg/L to accurately estimate higher concentrations based on the number of powder grains added to the water (See FIG. 3 and FIG. 4).

Live zebra mussels attached to a rock were introduced into the respective buckets containing about 52,000 μg/L (spirulina) and 160,000 μg/L (alfalfa), prepared as described above. In both instances, the rocks holding the zebra mussels were removed after 4 hours, and the zebra mussels were not responsive. Additionally, the zebra mussels that were killed using spirulina at 52,000 μg/L showed a green tint upon visual examination, evidencing spirulina ingestion.

The invention claimed is:

1. A method of controlling the spread of an invasive *Dreissenid* mussel species comprising introducing a nonnative source of chlorophyll to a body of water comprising the invasive mussel species, wherein:
   the nonnative source of chlorophyll is added at an amount sufficient to provide a concentration of chlorophyll in the body of water of at least about 10 μg/L and that is nonharmful to other aquatic life; and
   the body of water has a pH of about 7 to about 8 after introducing the nonnative source of chlorophyll.

2. The method of claim 1, wherein the nonnative source of chlorophyll is added to provide a chlorophyll concentration of about 10 μg/L to about 200,000 μg/L.

3. The method of claim 1, wherein the nonnative source of chlorophyll comprises a material selected from the group consisting of cyanobacteria, alfalfa, soy beans, wheat grass, wheat straw, barley grass, mulberry, chlorella, sea weed, fresh water moss, spirulina, and mixtures thereof.

4. The method of claim 1, wherein the nonnative source of chlorophyll is provided in a form selected from the group consisting of vapor, liquid, paste, powder, pellets, cubes, blocks, animalia food, and combinations thereof.

TABLE 19

| Example: ALFALFA POWDER | | | Example: SPIRULINA POWDER | |
| --- | --- | --- | --- | --- |
| GRAINS | CHLOROPHYLL ug/L | DISTILLED WATER GRAINS | GRAINS | CHLOROPHYLL ug/L |
| 2 | 15 | 56,000 | 2 | 36 |
| 4 | 25 | 56,000 | 6 | 77 |
| 6 | 37 | 56,000 | 8 | 91 |
| 8 | 55 | 56,000 | 12 | 129 |
| 10 | 56 | 56,000 | 16 | 147 |
| 12 | 70 | 56,000 | 18 | 158 |
| 14 | 79 | 56,000 | 20 | 167 |
| 16 | 91 | 56,000 | 24 | 177 |
| 18 | 100 | 56,000 | 28 | 177 |
| 20 | 107 | 56,000 | 30 | 198 |
| 22 | 123 | 56,000 | | |
| 24 | 127 | 56,000 | | |
| 26 | 137 | 56,000 | | |
| 28 | 149 | 56,000 | | |
| 30 | 152 | 56,000 | | |
| 32 | 150 | 56,000 | | |
| 34 | 163 | 56,000 | | |
| 36 | 162 | 56,000 | | |
| 38 | 170 | 56,000 | | |
| 40 | 188 | 56,000 | | |
| 42 | 191 | 56,000 | | |
| 44 | 199 | 56,000 | | |

To determine that consistent mussel eradication could be achieved at higher chlorophyll levels (above 200 μg/L) and different powder consistencies, two tests were performed at concentrations of 52,000 μg/L (prepared using spirulina powder) and 160,000 μg/L (prepared using alfalfa powder). The chlorophyll concentrations were prepared in buckets by adding the appropriate amount of spirulina powder or alfalfa powder to buckets of distilled water based on the extrapolated trendlines described above (See FIG. 3 and FIG. 4).

5. The method of claim 1, further comprising collecting an aquatic plant or algae material from the body of water and artificially processing the material to form the nonnative source of chlorophyll.

6. The method of claim 1, wherein the nonnative chlorophyll is introduced to the body of water so as to provide an average chlorophyll concentration in the body of water of about 15 μg/L to about 25 μg/L for about 3 to about 4 days.

7. The method of claim 1, wherein the nonnative chlorophyll is introduced to the body of water so as to provide an average chlorophyll concentration in the body of water of about 20 µg/L to about 40 µg/L for about 1 to about 2 days.

8. The method of claim 1, wherein the nonnative chlorophyll is introduced to the body of water so as to provide an average chlorophyll concentration in the body of water of at least about 40 µg/L for less than about 24 hours.

9. The method of claim 1, wherein the body of water has a turbidity of about 5 ppm to about 500 ppm after introducing the nonnative source of chlorophyll.

10. The method of claim 1, wherein the method does not comprise introducing a heavy metal to the body of water.

11. The method of claim 1, wherein the introducing comprises pouring, spreading, or spraying the nonnative source of chlorophyll onto the surface of the body of water, or injecting the nonnative source of chlorophyll into the body of water below the surface of the water, or feeding the nonnative source of chlorophyll to an animalia that defecates in the body of water.

12. A method of controlling the spread of an invasive *Dreissenid* mussel species comprising introducing a nonnative source of chlorophyll to a body of water comprising the invasive mussel species, wherein:
   the nonnative source of chlorophyll is added at an amount sufficient to provide a concentration of chlorophyll in the body of water of at least about 10 µg/L and that is nonharmful to other aquatic life; and
   the nonnative source of chlorophyll comprises a material selected from the group consisting of cyanobacteria, alfalfa, soy beans, wheat grass, wheat straw, barley grass, mulberry, chlorella, sea weed, fresh water moss, spirulina, and mixtures thereof.

13. The method of claim 12, wherein the nonnative source of chlorophyll is added to provide a chlorophyll concentration of about 10 µg/L to about 200,000 µg/L.

14. The method of claim 12, wherein the nonnative source of chlorophyll is provided in a form selected from the group consisting of vapor, liquid, paste, powder, pellets, cubes, blocks, animalia food, and combinations thereof.

15. The method of claim 12, wherein the nonnative chlorophyll is introduced to the body of water so as to provide an average chlorophyll concentration in the body of water of about 15 µg/L to about 25 µg/L for about 3 to about 4 days.

16. The method of claim 12, wherein the nonnative chlorophyll is introduced to the body of water so as to provide an average chlorophyll concentration in the body of water of about 20 µg/L to about 40 µg/L for about 1 to about 2 days.

17. The method of claim 12, wherein the nonnative chlorophyll is introduced to the body of water so as to provide an average chlorophyll concentration in the body of water of at least about 40 µg/L for less than about 24 hours.

18. The method of claim 12, wherein the body of water has a turbidity of about 5 ppm to about 500 ppm after introducing the nonnative source of chlorophyll.

19. The method of claim 12, wherein the method does not comprise introducing a heavy metal to the body of water.

20. The method of claim 12, wherein the introducing comprises pouring, spreading, or spraying the nonnative source of chlorophyll onto the surface of the body of water, or injecting the nonnative source of chlorophyll into the body of water below the surface of the water, or feeding the nonnative source of chlorophyll to an animalia that defecates in the body of water.

21. A method of controlling the spread of an invasive *Dreissenid* mussel species comprising introducing a nonnative source of chlorophyll to a body of water comprising the invasive mussel species, wherein:
   the nonnative source of chlorophyll is added at an amount sufficient to provide a concentration of chlorophyll in the body of water of about 10 µg/L to about 200,000 µg/L; and
   the body of water has a pH of about 7 to about 8 after introducing the nonnative source of chlorophyll.

22. The method of claim 21, wherein the nonnative source of chlorophyll is added to provide a chlorophyll concentration of about 10 µg/L to about 160,000 µg/L.

23. The method of claim 21, wherein the nonnative source of chlorophyll comprises a material selected from the group consisting of cyanobacteria, alfalfa, soy beans, wheat grass, wheat straw, barley grass, mulberry, chlorella, sea weed, fresh water moss, spirulina, and mixtures thereof.

24. The method of claim 21, wherein the nonnative source of chlorophyll is provided in a form selected from the group consisting of vapor, liquid, paste, powder, pellets, cubes, blocks, animalia food, and combinations thereof.

25. The method of claim 21, further comprising collecting an aquatic plant or algae material from the body of water and artificially processing the material to form the nonnative source of chlorophyll.

26. The method of claim 21, wherein the nonnative chlorophyll is introduced to the body of water so as to provide an average chlorophyll concentration in the body of water of about 15 µg/L to about 25 µg/L for about 3 to about 4 days.

27. The method of claim 21, wherein the nonnative chlorophyll is introduced to the body of water so as to provide an average chlorophyll concentration in the body of water of about 20 µg/L to about 40 µg/L for about 1 to about 2 days.

28. The method of claim 21, wherein the nonnative chlorophyll is introduced to the body of water so as to provide an average chlorophyll concentration in the body of water of at least about 40 µg/L for less than about 24 hours.

29. The method of claim 21, wherein the body of water has a turbidity of about 5 ppm to about 500 ppm after introducing the nonnative source of chlorophyll.

30. The method of claim 21, wherein the method does not comprise introducing a heavy metal to the body of water.

31. The method of claim 21, wherein the introducing comprises pouring, spreading, or spraying the nonnative source of chlorophyll onto the surface of the body of water, or injecting the nonnative source of chlorophyll into the body of water below the surface of the water, or feeding the nonnative source of chlorophyll to an animalia that defecates in the body of water.

32. A method of controlling the spread of an invasive Dreissenid mussel species comprising introducing a nonnative source of chlorophyll to a body of water comprising the invasive mussel species, wherein:
   the nonnative source of chlorophyll is added at an amount sufficient to provide a concentration of chlorophyll in the body of water of about 10 µg/L to about 200,000 µg/L; and
   the nonnative source of chlorophyll comprises a material selected from the group consisting of cyanobacteria, alfalfa, soy beans, wheat grass, wheat straw, barley grass, mulberry, chlorella, sea weed, fresh water moss, spirulina, and mixtures thereof.

33. The method of claim 32, wherein the nonnative source of chlorophyll is added to provide a chlorophyll concentration of about 10 µg/L to about 160,000 µg/L.

34. The method of claim 32, wherein the nonnative source of chlorophyll is provided in a form selected from the group consisting of vapor, liquid, paste, powder, pellets, cubes, blocks, animalia food, and combinations thereof.

35. The method of claim 32, wherein the nonnative chlorophyll is introduced to the body of water so as to provide an average chlorophyll concentration in the body of water of about 15 µg/L to about 25 µg/L for about 3 to about 4 days.

36. The method of claim 32, wherein the nonnative chlorophyll is introduced to the body of water so as to provide an average chlorophyll concentration in the body of water of about 20 µg/L to about 40 µg/L for about 1 to about 2 days.

37. The method of claim 32, wherein the nonnative chlorophyll is introduced to the body of water so as to provide an average chlorophyll concentration in the body of water of at least about 40 µg/L for less than about 24 hours.

38. The method of claim 32, wherein the body of water has a turbidity of about 5 ppm to about 500 ppm after introducing the nonnative source of chlorophyll.

39. The method of claim 32, wherein the method does not comprise introducing a heavy metal to the body of water.

40. The method of claim 32, wherein the introducing comprises pouring, spreading, or spraying the nonnative source of chlorophyll onto the surface of the body of water, or injecting the nonnative source of chlorophyll into the body of water below the surface of the water, or feeding the nonnative source of chlorophyll to an animalia that defecates in the body of water.

* * * * *